United States Patent Office 2,722,107
Patented Nov. 1, 1955

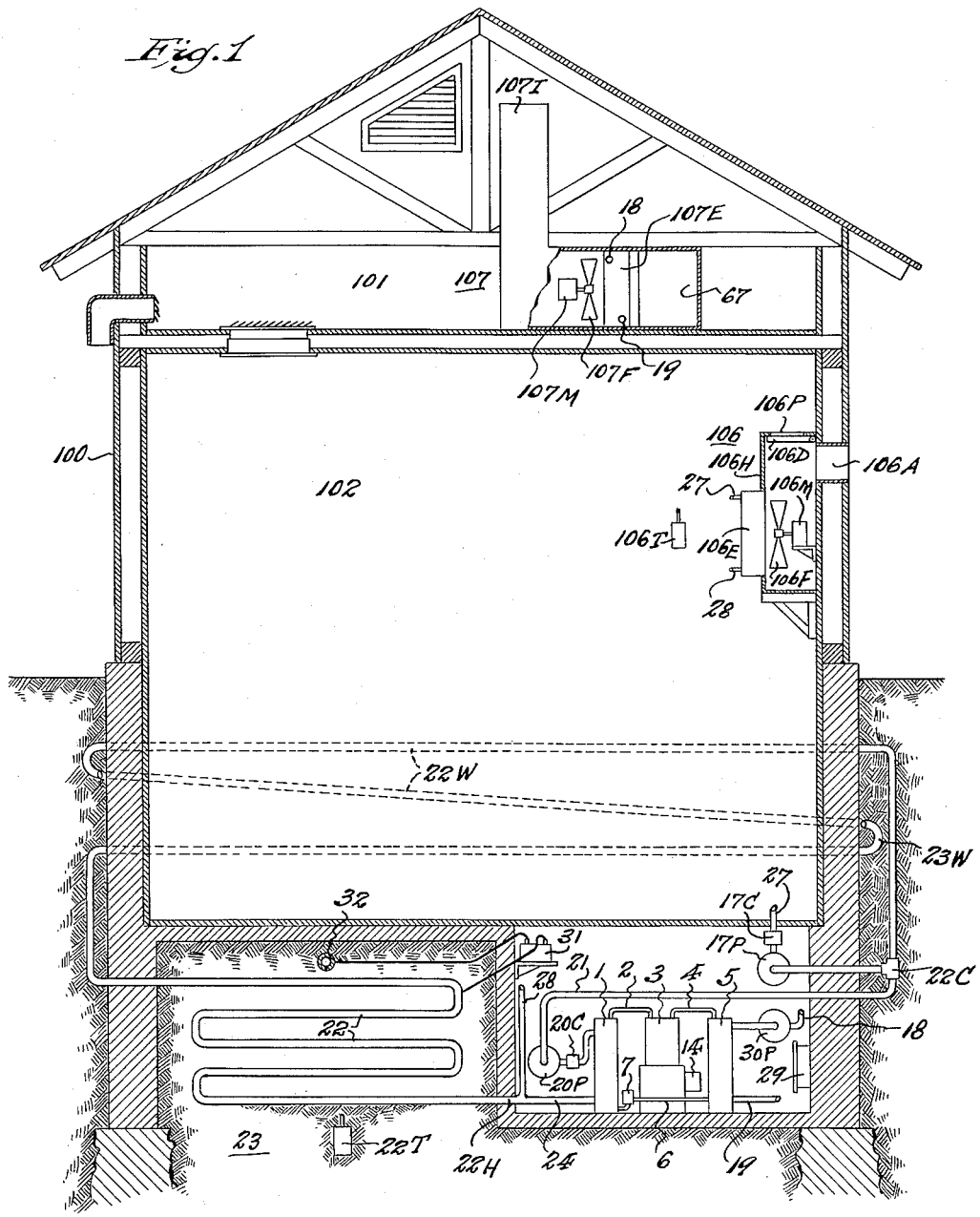

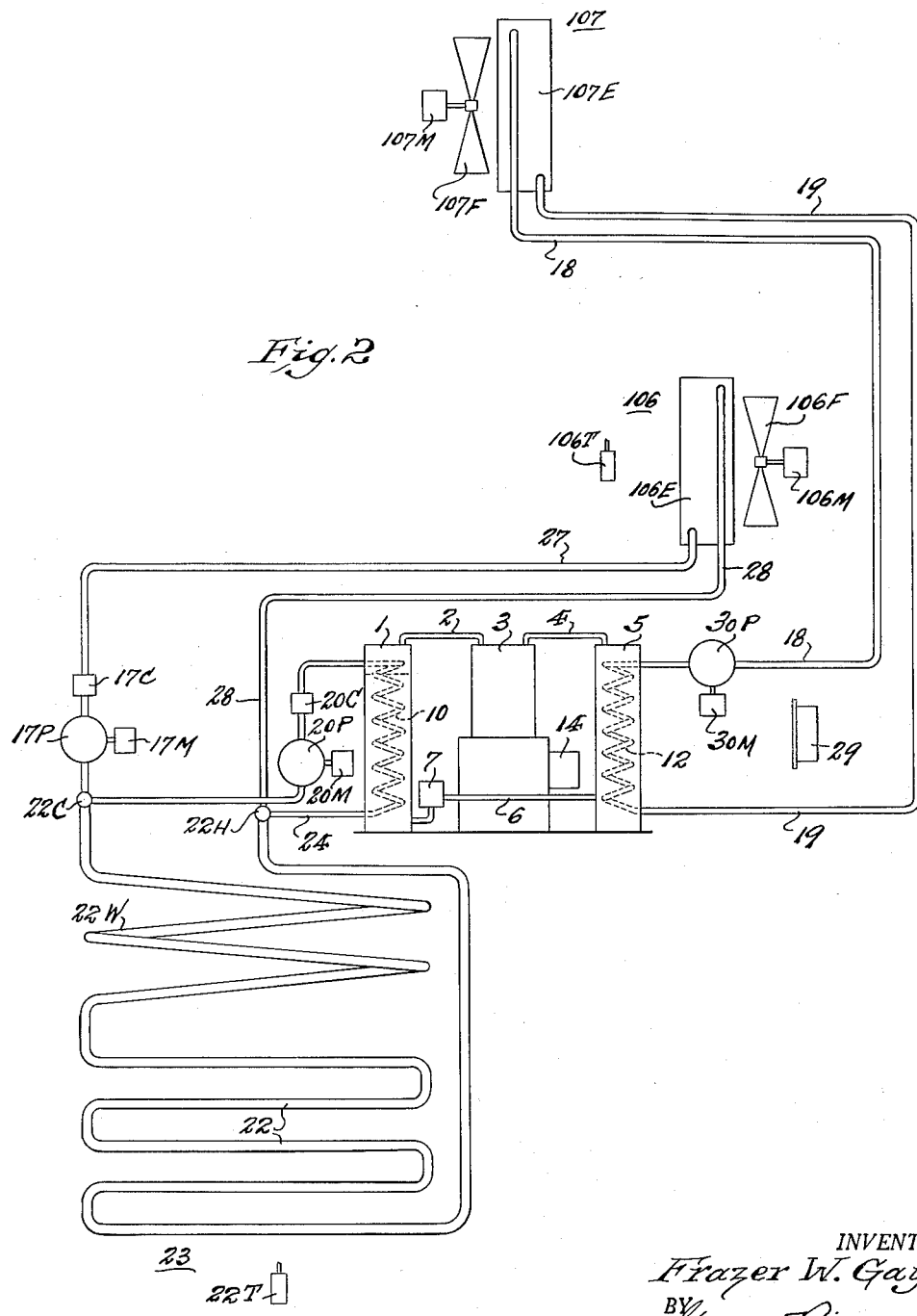

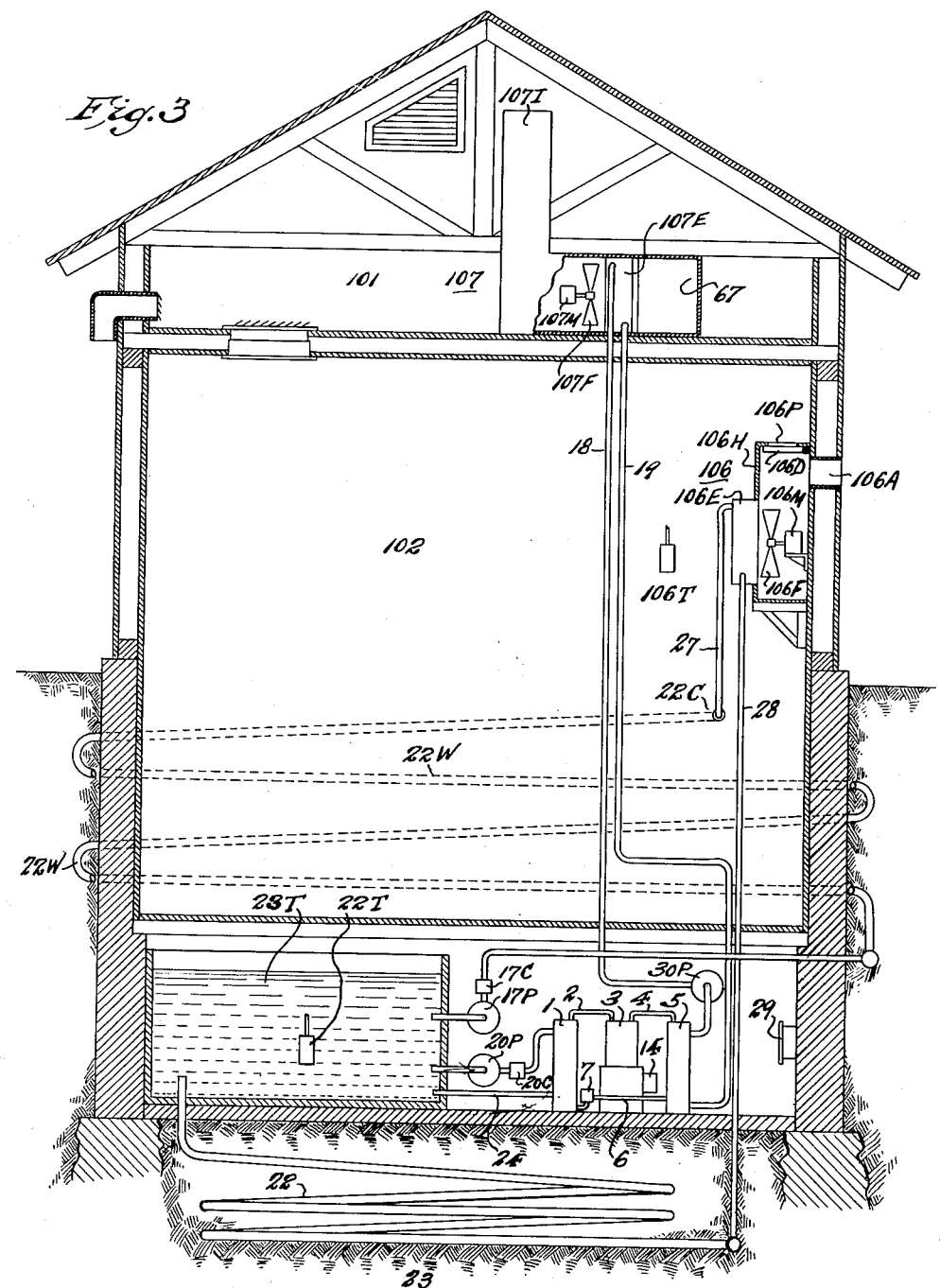

2,722,107

HOUSE COOLING SYSTEM

Frazer W. Gay, Metuchen, N. J.

Application April 8, 1952, Serial No. 281,210

6 Claims. (Cl. 62—6)

This invention relates to a system for evacuating heat from house space whereby to cool the space in summer weather to a relatively low temperature; and the invention has reference, more particularly, to a novel cooling system which includes an earth storage area adjacent the house into which heat can be delivered or dumped from the house space during hot daylight hours, and which further includes an electrically driven heat pump adapted to be operated during relatively cool night hours, whereby to discharge accumulated heat from the earth storage area so as to maintain its heat acceptability for reception of heat during daylight hours.

Electrically operated air cooling systems to serve building interiors now in general and extensive use involve a power consumption demand which greatly increases the generating load of the serving utility during hot daylight hours of summer weather. As a consequence of this, the total power capability required in the locality or area served by the generating utility must be such as to be able to satisfy the power demand for cooling system operations at the hottest hour during the hottest day of summer. Such requirement is detrimental to economical utility operation.

Having the above in view, it is an object of this invention to provide an electrically operated house space cooling system of such novel character and which so operates that there is but minimum power demand made upon the generating utility during the hottest periods of a summer day, by reason of the fact that heat, at such times, can be temporarily delivered or dumped into a receptive earth storage area, and then later, e. g. during relatively cool night hours, pumped out from the earth storage area for discharge to and dissipation in the cool outdoor night air, thus spreading power demand so that no peak load is developed during hot daylight hours, while at the same time permitting efficient use of a heat pump of comparatively small capacity involving minimum consumption of operating current.

The invention has for a further object to provide a heat receptive earth storage comprising a lower heat acceptacle zone by which a maximum amount of heat delivered thereto from the house space can be received, and thence dissipated to deep underlying earth, and an upper heat acceptable zone which is maintained at a temperature less than that of said lower zone, so as to readily accept the remaining amount of heat delivered from the house space, thus reducing to a minimum the amount of stored heat required to be removed from the heat reception earth storage area by heat pump operation, so that:

1. The total electrical energy necessary to operate the system is reduced to a minimum.
2. The power demand is maintained at a minimum.
3. The power demand occurring during the hottest hours of the hottest summer day is negligible.

Another object of this invention is to bury a thermostat in the lower zone of the heat receptive earth storage area which is connected in the heat pump control circuit so as to be operative to close said circuit for starting operation of the heat pump only at times when the temperature of this zone rises so high that it no longer is able to adequately absorb the required amount of heat necessary to reduce the house space temperature to a desired relatively low value.

Another object of this invention is to include in the aforesaid thermostat controlled heat pump control circuit a time clock actuated switch means in series with the thermostat, whereby to hold said control circuit interrupted or open during the hours of the day when the load on the power generating utility serving operating current to the heat pump is at peak, thus inhibiting operation of the heat pump at such times.

A further object of this invention is to provide means adapted to maintain the soil of the heat receptive earth storage area in moist and therefore efficient heat conductive and acceptive condition; said means being operative under principles of electrical osmosis, whereby the movement of heat into and out of the soil is attained with a minimum temperature differential, and the heat conductivity between the receptive earth storage area and the underlying deep earth is maintained at a maximum, thus promating efficient dissipation of heat from said storage area to underlying deep earth.

A still further object of this invention is to so construct the house to be cooled that a substantial part thereof is countersunk in the earth of its site, so that the exterior wall area thereof which is exposed to extreme summer heat is reduced to a minimum, and so that heat transferred from the house interior into the surrounding earth, which forms part of the heat receptive storage area, warms the walls contiguous to said surrounding earth, and consequently condensation of moisture on the internal surfaces of said walls is prevented, thus avoiding dampness in said subterranean part of the house, so that such part thereof is maintained comfortable for occupancy and use as part of the living quarters of the house.

The above and additional objects and advantages of this invention will appear as the following description thereof is read in connection with the accompanying drawings, in which:

Fig. 1 is a schematic cross-sectional elevation of a house equipped with a cooling system according to this invention, which includes a heat receptive earth storage area beneath and around the lower part of the house.

Fig. 2 is a schematic view of the elements and apparatus as related to make up the house cooling system of this invention.

Fig. 3 is a view similar to that of Fig. 1, but showing a modified form of the house cooling system.

Similar characters of reference are employed in the above described views, to indicate corresponding parts.

Referring to Fig. 1, the house 100 is shown so constructed that its lower part extends below the ground level of its site. The house structure includes an attic space 101 above its living space 102. Preferably located within the attic space 101 is a heat dissipating device 107. Located within the living stace 102 is a house cooling device 106. Located in the lower region of the house is a heat pump comprising a compressor 3, driven by an electric motor 14, which pumps heat from an evaporator 1 to a condenser 5 by circulation of a refrigerant from the evaporator 1 through pipe 2 to the compressor 3, thence through pipe 4 to the condenser 5, and from the latter back to the evaporator 1 by way of return pipe 6 and float valve 7.

The earth adjacently beneath and around the lower part of the house provides a heat receptive earth storage area 23. That portion of this storage area 23 which lies beneath the house provides a lower heat acceptable zone through which extends a heat transfer fluid conducting conduit or pipe system 22 which is buried therein; and that portion of said storage area which lies adjacent to and around the side walls of the house provides an upper heat acceptable zone through which extends a heat transfer fluid conducting conduit or pipe coil 22W which is buried therein, and which preferably encircles the house walls. The discharge end of the lower zone conduit or pipe system 22 is connected in communication with the receiving end of the upper zone conduit or pipe coil 22W.

Connected with the discharge end 22C of the upper zone conduit or pipe coil 22W is a pump 17P, driven by an electric motor 17M, which delivers relatively cold heat transfer fluid from the heat receptive earth storage, through check valve 17C by way of delivery conduit 27, to the heat exchanger 106E of the house cooling device 106, returning said transfer fluid from the latter by way of a return conduit 28 to the receiving end 22H of the lower zone conduit or pipe system 22.

The heat exchanger 106E is mounted in the wall of an air delivery housing 106H so that air, passed by operation of an air circulating fan 106F and its driving motor 106M, is discharged through said heat exchanger 106E into the house interior. Said housing 106H is provided with a port 106P which communicates with the house interior. Said housing 106H is further provided with a port 106A in the adjacent house wall for communication with the outdoor atmosphere. A damper 106D can be optionaly moved to close the outdoor port 106A and open the indoor port 106P, or vice versa.

In the hot hours of a summer day, when the outdoor air is of high temperature, the damper 106D is disposed to close the outdoor port 106A and open the indoor port 106P. Under these conditions, the pump 17P being operative, relatively cool heat transfer fluid is circulated through the heat exchanger 106E, and warm or hot air, drawn from the house interior by operating fan 106F and discharged through the heat exchanger 106E back into the house interior, gives up its heat to the relatively cool heat transfer fluid circulating through said heat exchanger 106E, being thereby reduced in temperature, so as to be returned to the house interior as relatively cool air. The transfer fluid, as it flows from the heat exchanger 106E through the return conduit 28 and back into the conduit or pipe system 22 of the lower zone of the earth storage area through the receiving end 22H thereof, carries the heat absorbed from the house air to earth storage to which said heat is given up, thereby to again cool the transfer fluid for recirculation through the house cooling device 106. In this way, heat from the house interior is carried to and stored in the earth storage area 23, subject to dissipation therefrom to deep earth, or to later discharge therefrom by heat pump operation, as hereinafter more particularly described.

When the outdoor air is of lower temperature than that of indoor air, the damper 106D can be positioned to close the indoor port 106P and open the outdoor port 106A, whereupon cool air can be directly passed into the house interior. Under such circumstances, the heat transfer circulating pump 17P would usually be stopped.

The heat dissipating device 107, which is preferably located in the attic space 101, comprises a duct structure having an upstanding intake section 107I at one end, which is open adjacent to the peak of the attic interior, and a discharge section which communicates with a port 67 opening to the outdoor atmosphere through a house wall. Within the duct structure is an air circulating fan 107F driven by a motor 107M, and a heat exchange 107E intermediate said fan and the discharge port 67.

When the fan 107F is operating, air is drawn from the peak of the attic and discharged to the outdoor atmosphere through the port 67, thus serving to cool the attic atmosphere.

The heat pump evaporator 1 contains a coil 10 through which heat transfer fluid can be caused to flow from the conduit or pipe system 22 and conduit or pipe coil 22W of the earth storage area 23. A pump 20P, driven by an electric motor 20M, draws the heat transfer fluid from the end 22H of the conduit or pipe system 22 through a conduit 24, and delivers the same to said coil 10, thence returning the same to the end 22C of the conduit or pipe coil 22W through check valve 20C and conduit 21.

The heat pump condenser 5 contains a coil 12 through which flows a separate heat transfer fluid for circulation through the heat exchanger 107E of the heat dissipating device 107. A pump 30P, driven by an electric motor 30M, delivers said separate heat transfer fluid from the condenser coil 12 through a delivery conduit 18 to the heat exchanger 107E, returning the same from the latter through a return conduit 19 back to said condenser coil 12.

The fan 107F of the heat dissipating device 107 will generally be operated for several evening hours of the day, so that indoor attic temperature will drop to approximately outdoor temperature by the time the utility peak load demand has passed, whereupon the heat pump can be operated without adding to said peak load demand. After the peak load demand has passed, and operation of the heat pump is started, said heat pump, even of small capacity, can efficiently serve, over a minimum running time during relatively cool night hours of the day, to evacuate previously delivered or dumped heat from the heat receptive earth storage area 23, whereby to reduce the temperature of this area to a point which renders the area readily acceptive of heat for temporary storage during hot daylight hours of the following summer day.

When, under the above circumstances, the heat pump is put in operation, hot transfer fluid from the storage area 23 is circulated, by the operating pump 20P, through the coil 10 and gives up its heat to boil the refrigerant in the evaporator 1. The resultant refrigerant gas then passes to the heat pump compressor 3, being therein compressed to further elevate its temperature, and then passes to the condenser 5. In the condenser 5 the high temperature refrigerant gas is condensed, giving up its heat to the separate transfer fluid circulating through the coil 12, and the condensed refrigerant is then returned to the evaporator 1 for recirculation through the heat pump. The heat given up by the condensed refrigerant gas to the separate transfer fluid passing through the coil 12 is carried by the transfer fluid to the attic heat exchanger 107E, and as it flows therethrough, gives up the carried heat to cool air driven through said heat exchanger 107E by the fan 107F, and thence evacuated to the outdoor cool night atmosphere. In this way accumulated heat, not already dissipated to deep earth from the storage area 23, is evacuated from said storage area 23, so that the earth temperature of said storage area 23 is sufficiently reduced as to render said area readily acceptive of heat delivered to and dumped therein from the house space, when outdoor temperature rises during subsequent hours of daylight.

To promote heat conductivity of the heat receptive earth storage area 23, it is desirable to keep the soil of such area in a moist condition. To accomplish this, one or more perforate water distributing pipes 32 are located within the heat receptive earth storage area, and a source of electrical energy, shown by way of illustration as a battery 31, is provided; one pole of which is connected to the water distributing pipes 32, and the other pole thereof to the conduit or pipe system 22 within said storage area. If the soil of said storage area becomes too dry and of low thermal conductivity, water, discharged from the pipes 32, is caused to flow to the conduit or pipe system 22 by electrical osmosis, thus tending to hold moisture around the latter, and thereby increasing the thermal conduction of the soil in aid of transfer of heat from said conduit or pipe system 22 to the earth storage area.

The operation of the heat pump can be automatically controlled by burying a thermostat 22T in the lower zone of the heat receptive earth storage area, said thermostat being so adjusted as to close the heat pump serving circuit when the temperature of the storage area rises to or above a predetermined maximum value, e. g., 65° F., but opens said circuit and stops the heat pump when the storage area temperature drops to a desired lower value, e. g., 63° F. If it is desired to further control operation of the heat pump so as to prevent its operation during periods of a generating utility peak load, the heat pump serving circuit may include a time clock switch 29 in series with the thermostat 22T, said time clock switch being so adjusted as to hold said circuit open during peak load periods.

The operation of the pump 17T, which circulates heat transfer fluid through the house cooling device 106, can also be automatically controlled by a thermostat 106T which is subject to influence of house space temperature, so that said pump 17P is automatically stopped when a desired drop in house space temperature is attained, and again started when house space temperature rises to or above a predetermined maximum.

Referring now to Fig. 3, there is shown therein a modified arrangement of a house cooling system according to this invention and operative within the principles thereof. In this modified arrangement, the heat transfer fluid comprises water. A tank 23T is located within the lower part of the house to contain a substantial body of water. This tank is connected in series with and between the conduit or pipe system 22 of the lower zone of the heat receptive earth storage area 23 and the conduit or pipe coil 22W of the upper zone of said storage area. In this arrangement, the pump 17P, which serves the house cooling device 106, draws water from the tank 23T and delivers it through the storage area conduit or pipe coil 22W, and from the discharge end 22C of the latter to the heat exchangers 106E by a connecting conduit or pipe 27, returning the same by conduit or pipe 28 to the lower end of the storage area conduit or pipe system 22, and thence back to tank 23T; thus carrying heat taken from the house space and dumping it into the storage area 23.

The pump 20P circulates water from the tank 23T through the coil 10 in evaporator 1 of the heat pump and back to said tank, said coil being the same as shown in Fig. 2.

The delivery of hot transfer fluid from the coil 12 of the heat pump condenser 5 (which is the same as shown in Fig. 2) to and through the heat dissipating device 107 and back to coil 12 is accomplished by the pump 30P in the same way and for the same purpose as already explained in connection with the first described embodiment of the cooling system of this invention.

It will be understood that other variations in the cooling system arrangement and its parts may be made within the principles and scope of this invention. For example, it will be obvious to the skilled in the art that, instead of circulating a separate heat transfer fluid through the heat dissipating device 107, the hot refrigerant gas may be passed from the heat pump through the heat exchanger 107E and back to the heat pump; in which case, said heat exchanger 107E will serve as a heat pump condenser. Also the heat pump evaporator 1 could be submerged in the tank 23T so as to extract heat from the water content of the latter.

It is intended that the matter contained in the foregoing description and shown in the accompanying drawings shall be interpreted as illustrative and not in a limiting sense.

Having now described my invention, I claim:

1. In a house cooling system, a house space cooling device, a heat receptive earth storage area adjacent to the house including conduit means for conducting a heat transfer fluid therethrough, pump means operative to circulate said heat transfer fluid first through said house space cooling device to absorb heat from house air passed through said device and thence through the conduit means of the storage area, whereby the heat transfer fluid is warmed in the house space cooling device and then cooled by transfer of its carried heat to said storage area, and said conduit means of the storage area comprising a section located in a lower zone of the storage area adjacent to deep earth and a section located in an upper zone of said storage area, the connection of said conduit means with the house space cooling device being such that heat transfer fluid flows from the latter first through the lower zone section of said conduit means and thence through the section of said conduit located in the relatively cool upper zone of the storage area, whereby a maximum amount of heat carried by the transfer fluid is transferred to said lower zone of the storage area subject to dissipation in cool deep earth.

2. In a house cooling system, a house space cooling device, a heat receptive earth storage area adjacent to the house including conduit means for conducting a heat transfer fluid therethrough, pump means operative to circulate said heat transfer fluid first through said house space cooling device to absorb heat from house air passed through said device and thence through the conduit means of the storage area, whereby the heat transfer fluid is warmed in the house space cooling device and then cooled by transfer of its carried heat to said storage area, said conduit means of the storage area comprising a section located in a lower zone of the storage area adjacent to deep earth and a section located in an upper zone of said storage area, the connection of said conduit means with the house space cooling device being such that heat transfer fluid flows from the latter first through the lower zone section of said conduit means and thence through the section of said conduit located in the relatively cool upper zone of the storage area, whereby a maximum amount of heat carried by the transfer fluid is transferred to said lower zone of the storage area subject to dissipation in cool deep earth, and heat pump operated means adapted to evacuate heat from said storage area to the atmosphere, whereby to cool said storage area to an efficient heat acceptive condition.

3. In combination with a house structure partially extending into the earth of its site, a house space cooling device, a heat receptive earth storage area beneath and around the exterior of the house structure and conduit means for conducting a heat transfer fluid through said earth storage area, means to circulate the heat transfer fluid through the house space cooling device and the storage area conduit means, whereby heat from the house space is transmitted to the heat transfer fluid and carried thereby through the storage area conduit means to be transferred from the latter to the storage area earth beneath and exteriorly around the house structure, thereby warming the floor and underground walls of the house structure, and thus avoiding moisture condensation upon the interior surfaces of said house floor and walls.

4. In combination with a house structure partially extending into the earth of its site, a house space cooling device, a heat receptive earth storage area beneath and around the exterior of the house structure and conduit means for conducting a heat transfer fluid through said earth storage area, force pump means to circulate the heat transfer fluid through the house space cooling device and thence to and through the storage area conduit means, whereby heat from the house space is transmitted to the heat transfer fluid and carried thereby through the storage area conduit means to be transferred from the latter to the storage area earth beneath and exteriorly around the house structure, thereby warming the floor and underground walls of the house structure, and thus avoiding moisture condensation upon the interior surfaces of said house floor and walls, an electrically driven heat pump adapted to evacuate heat from the storage area to the outdoor atmosphere, and a time controlled service circuit for said heat pump to limit operation of the latter to the hours of relatively cool night air temperature and off peak hours of the power serving utility.

5. In a house cooling system, a house space cooling device, a heat receptive earth storage area adjacent to the house consisting in an upper storage portion and a lower storage portion, conduit means for conducting a heat transfer fluid through said earth storage area, force pump means operative to circulate said heat transfer fluid first through said house space cooling device to absorb heat from the house air passed through said device and thence to and through the conduit means of a storage area, whereby the heat transfer fluid is warmed in the house space cooling device and then cooled by transfer of its carried heat to said storage area, an electrically driven heat pump adapted to evacuate heat from the storage area to the outdoor atmosphere, a power utility supplied service circuit for the heat pump, said circuit including thermostatic means located within said lower portion of the earth storage area and adapted to close the circuit for operation of the heat pump when the temperature of the said lower portion of the earth storage area rises above a predetermined value.

6. In a house cooling system, a house space cooling device, a heat receptive earth storage area adjacent to the house including conduit means for conducting a heat transfer fluid therethrough, pump means operative to circulate said heat transfer fluid first through said house space cooling device to absorb heat from the house air passed through said device and thence through the conduit means of the storage area, whereby the heat transfer fluid is warmed in the house space cooling device and then cooled by transfer of its carried heat to said storage area, an electrically driven heat pump operated means adapted to evacuate heat from the storage area to the outdoor atmosphere, a power utility supplied service circuit for the heat pump, said circuit including thermostatic means located within said storage area and adapted to close the circuit for operation of the heat pump when the temperature of the storage area rises above a predetermined value, and said circuit further including, in series with said thermostatic means, a time controlled switch means operative to close the circuit only during off peak cool night hours.

References Cited in the file of this patent

UNITED STATES PATENTS

| | | |
|---|---|---|
| 1,969,187 | Schutt | Aug. 7, 1934 |
| 2,295,983 | Williams | Sept. 15, 1942 |
| 2,428,312 | Herbener | Sept. 30, 1947 |
| 2,428,876 | Hawkins | Oct. 14, 1947 |
| 2,495,861 | Newton | Jan. 31, 1950 |
| 2,513,373 | Sporn | July 4, 1950 |
| 2,529,154 | Hammond | Nov. 7, 1950 |
| 2,575,478 | Wilson | Nov. 20, 1951 |
| 2,581,744 | Zimmerman | Jan. 8, 1952 |
| 2,584,573 | Gay | Feb. 5, 1952 |